United States Patent
Friedman (10) Patent No.: US 9,313,204 B2
(45) Date of Patent: Apr. 12, 2016

(54) INCREMENTALLY CHANGING THE AVAILABILITY OF A FEATURE

(71) Applicant: Microsoft Technology Licensing, LLC, Redmond, WA (US)

(72) Inventor: Greg S. Friedman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/175,246

(22) Filed: Feb. 7, 2014

(65) Prior Publication Data

US 2014/0156860 A1 Jun. 5, 2014

Related U.S. Application Data

(62) Division of application No. 12/352,878, filed on Jan. 13, 2009, now Pat. No. 8,856,361.

(51) Int. Cl.
*H04L 29/06* (2006.01)
*G06F 9/50* (2006.01)

(52) U.S. Cl.
CPC ............... *H04L 63/10* (2013.01); *G06F 9/505* (2013.01)

(58) Field of Classification Search
CPC ........................................... H04L 63/10
USPC .......... 717/170, 168, 171; 709/204, 206, 226; 705/14.53, 14.54, 14.39, 26.1
See application file for complete search history.

(56) References Cited

U.S. PATENT DOCUMENTS

| | | | |
|---|---|---|---|
| 5,644,720 A | 7/1997 | Boll et al. | |
| 5,644,730 A | 7/1997 | Fayfield | |
| 5,835,911 A | 11/1998 | Nakagawa et al. | |
| 6,047,273 A | 4/2000 | Vaghi | |
| 6,134,532 A | 10/2000 | Lazarus et al. | |
| 6,560,604 B1 | 5/2003 | Fascenda | |
| 6,687,816 B1 | 2/2004 | Frayman et al. | |
| 7,167,914 B2 | 1/2007 | Cohen et al. | |
| 7,555,551 B1 * | 6/2009 | McCorkendale | G06F 8/65 709/225 |
| 7,765,194 B1 | 7/2010 | Sharma et al. | |
| 7,890,957 B2 | 2/2011 | Campbell | |
| 8,856,361 B2 | 10/2014 | Friedman | |

(Continued)

FOREIGN PATENT DOCUMENTS

WO    WO-03044662    5/2003

OTHER PUBLICATIONS

"Service Level Agreements in Service-Oriented Architecture Environments"—Bianco et al, Carnegie Mellon University, Sep. 2008 http://www.sei.cmu.edu/reports/08tn021.pdf.*

(Continued)

*Primary Examiner* — Randy Scott
(74) *Attorney, Agent, or Firm* — Jim Banowsky; Doug Barker; Micky Minhas (57) ABSTRACT

Techniques are described to incrementally change the availability of a feature of a software service to clients over a network based on a configuration setting indicating the proportion of the clients that is eligible to receive the feature. In an implementation, a client rank is generated for a client on the network based on a client identification that identifies the client and a feature identification that identifies the feature. The feature may then be made available to the clients via the network if a comparison of the client rank with the configuration setting indicates that the client is eligible to access the feature.

19 Claims, 5 Drawing Sheets

(56) References Cited

U.S. PATENT DOCUMENTS

| | | | |
|---|---|---|---|
| 2003/0033242 | A1 | 2/2003 | Lynch et al. |
| 2003/0200286 | A1 | 10/2003 | Barfurth et al. |
| 2003/0233462 | A1 | 12/2003 | Chien |
| 2004/0068541 | A1 | 4/2004 | Bayassi et al. |
| 2005/0108103 | A1 | 5/2005 | Roberts et al. |
| 2005/0120106 | A1 | 6/2005 | Albertao |
| 2006/0221920 | A1 | 10/2006 | Gopalakrishnan et al. |
| 2007/0011054 | A1 | 1/2007 | Sattler et al. |
| 2007/0011155 | A1* | 1/2007 | Sarkar ............................ 707/5 |
| 2009/0036190 | A1 | 2/2009 | Brosnan et al. |
| 2009/0055252 | A1 | 2/2009 | Samuel |
| 2009/0245115 | A1* | 10/2009 | Krishnaswamy ... H04L 41/5025 370/242 |
| 2010/0175060 | A1 | 7/2010 | Boykin et al. |
| 2010/0180040 | A1 | 7/2010 | Friedman |

OTHER PUBLICATIONS

"Final Office Action", U.S. Appl. No. 12/352,878, Jul. 12, 2011, 17 pages.

"Non-Final Office Action", U.S. Appl. No. 12/352,878, Jun. 10, 2013, 10 pages.

"Non-Final Office Action", U.S. Appl. No. 12/352,878, Dec. 10, 2010, 12 pages.

"Non-Final Office Action", U.S. Appl. No. 12/352,878, Sep. 7, 2010, 12 pages.

"Notice of Allowance", U.S. Appl. No. 12/352,878, Nov. 6, 2013, 8 pages.

"Online Experiments: Lessons Learned", http://exp-platform.,com/Documents/IEEEComputer2007OnlineExperiments.pdf, Sep. 2007, 3 pages.

"Restriction Requirement", U.S. Appl. No. 12/352,878, Feb. 11, 2013, 5 pages.

"Supplemental Non-Final Office Action", U.S. Appl. No. 12/352,878, Feb. 9, 2011, 13 pages.

Haeger, "Feature Update in the SaaS World", Retrieved from <http://reverendted.wordpress.com/2007/09feature-updates-in-the-saas-world/> on Oct. 30, 2008, Sep. 12, 2007, pp. 1-5.

Kohavi, et al., "Online Experiments: Lessons Learned", Web Technologies, Computer, Sep. 2007, pp. 85-87.

Nejmeh, "Business-Driven Product Planning Using Feature Vectors and Increments", http://ieeexplore.ieee.org/stamp/stamp.jsp?arnumber=1049385&isnumber=22486, Nov. 2002, pp. 34-42.

Piatek, et al., "building BitTyrant, a (more) strategic BitTorrent client", Login: vol. 32, No. 4, Aug. 2007, pp. 8-13.

* cited by examiner

INCREMENTALLY CHANGING THE AVAILABILITY OF A FEATURE

RELATED APPLICATION

This application claims priority as a divisional of U.S. patent application Ser. No. 12/352,878, filed Jan. 13, 2009, entitled "Incrementally Changing the Availability of a Feature", the entire disclosure of which is incorporated by reference in its entirety.

BACKGROUND

The growth in availability of network-based software services is ever increasing. Network-based software services utilize a model of software deployment that allows software applications hosted by a centralized service provider to be accessed by large numbers of users across a network such as the Internet. In this manner, software service providers can leverage large economies of scale in the deployment, management, support of software.

SUMMARY

Techniques are described to incrementally change the availability of a feature of a network-based software service. In an implementation, a configuration setting indicates a proportion of the clients of a service provider that is eligible to access the feature. A client rank is generated for each client based on a client identification that identifies the client and a feature identification that identifies the feature. The feature may then be made available to the client via the network if a comparison of the client rank with the configuration setting indicates that the client is within the proportion of clients that is eligible to access the feature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Network-based software services are often deployed at scale to a large number of clients. When new features of a software service are introduced, it may be desirable to initially limit the number of clients that can access the feature. For example, the availability of a new feature may be restricted to give the service provider an opportunity to evaluate the feature on a limited scale before allowing a larger portion of service provider's clients to interact with the new feature. Similarly, in the event of a failure, an existing feature of a software service may be made unavailable to clients until the failure is resolved. Following resolution of the failure, it may be desirable to initially make the feature available to a limited number of clients so that the service provider may evaluate whether the feature is functioning in an acceptable manner. When the feature in determined to be functioning properly, a larger proportion of the service provider's clients may again be allowed to interact with the feature.

Techniques are described to incrementally change the availability of a feature of a network-based software service to clients based on a configuration setting that indicates a proportion of the clients that is eligible to receive the feature. In implementations, the feature may then be made available to the client via the network if a comparison of a client rank calculated for the client with the configuration setting indicates that the client is within the proportion of clients that is eligible to access the feature. In embodiments, the client ranks may be generated based on client identifications that uniquely identify each of the clients and a feature identification that uniquely identifies the feature. Further discussion of the calculation of client ranks and the comparison of client ranks with the configuration setting may be found in relation to FIGS. 3, 4 and 5.

In implementations, the configuration setting may be adjusted by the service provider to change the proportion of clients that are eligible to receive a feature. In this manner, the number of clients that are allowed to access the feature may be increased or decreased without employing an explicit operation to identify a particular client as having the feature enabled or disabled. Thus, the determination of whether or not a feature is available to a given client is computed mathematically so that persistent storage of attributes describing each client's eligibility to access a feature is unnecessary. Moreover, when the configuration setting is increased so that the proportion of clients that is eligible to access the feature is increased, clients that already have access to the feature maintain that access and perceive no interruption in service.

In the following discussion, an exemplary environment is first described that is operable to perform the techniques to incrementally change the availability of a feature of a software service to clients over a network described herein. Exemplary procedures are then described which may be employed in the exemplary environment, as well as in other environments without departing from the spirit and scope thereof.

Example Environment

Figure 1:
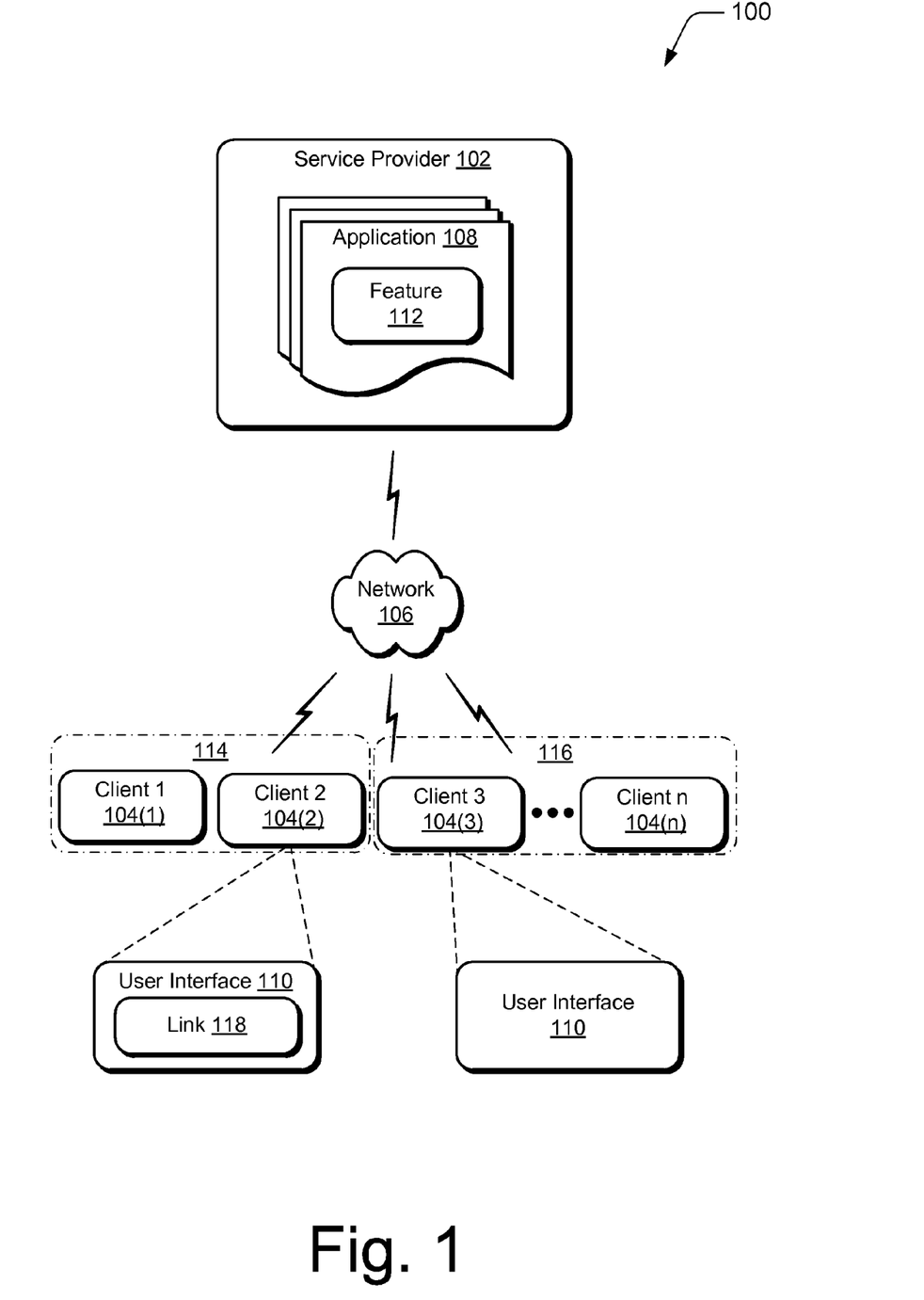
FIG. 1 is an illustration of an environment in an example implementation that is operable to incrementally change the availability of features of network based software services.

FIG. 1 illustrates of an environment 100 in an example implementation that is operable to incrementally change the availability of features of network based software services. The illustrated environment 100 includes a service provider 102 that is configured to deliver network-based software services to one or more clients 104(1)-104(n) over a network 106

(where "n" is an integer representing the total number of clients 104 connected to the network 106 that receive the software services from the service provider 102). In implementations, the service provider 102 may deliver the software services by furnishing access to one or more service-based software applications 108 via the network 106.

The service provider 102 may be configured in a variety of ways. For example, the service provider 102 may be configured as a server computer that is capable of communicating over a wired or wireless network. In one implementation, the service provider 102 may be an application service provider (ASP) that provides access to the one or more service-based software applications 108 to clients 104 via the Internet. The service provider 102 may also relate to a person and/or entity such as a software developer or service operator. Thus, the service provider 102 may describe logical clients that include operators (e.g., persons or entities), software and/or devices.

The clients 104 may also be configured in a variety of ways. For example, one or more of the clients 104 may be configured as a computer such as a desktop or laptop computer that is capable of communicating over a wired or wireless network. The clients 104 may also be configured as a mobile connected device such as a personal digital assistant, a smart phone, or a cell phone that is capable of communicating over a wireless network; an entertainment appliance; a set-top box communicatively coupled to a display device; a game console, and so forth. Thus, the clients 104 may range from full resource devices with substantial memory and processor resources (e.g., a personal computer, a game console, etc.) to low-resource devices with limited memory and/or processing resources (e.g., a cell phone, a set top box, etc.). The clients 104 may also relate to a user such as a person and/or entity that operate such devices. Thus, clients 104 may describe logical clients that include users (e.g., persons or entities), software and/or devices.

The network 106 may assume a wide variety of configurations. For example, the network 106 may include the Internet, a wide area network (WAN), a local area network (LAN), a wireless network (e.g., a WIFI (IEEE 802.11) network), a cellular telephone network, a public telephone network, an extranet, an intranet, and so on. Further, although a single network 106 is shown, the network 106 may be configured to include multiple networks. For instance, a desktop or laptop computer may connect to the Internet via a local area network so that the computer's web browser may access a webpage provided by a website within the World Wide Web (WWW). Similarly, a mobile browser in a smart phone may access a webpage within a corporate intranet via a cellular telephone network. A wide variety of other instances are contemplated.

In example implementations, the service provider 102 may provide the software applications 108 via a webpage hosted by the service provider 102 and accessed by clients 104 over the network 106 using a user interface 110 such as a web browser using Hyper Text Markup Language (HTML), a special purpose client software application provided to the client 104 by the service provider 102, and so forth. A web browser enables the client 104 to display and interact with a webpage such as a webpage within the World Wide Web, a webpage provided by a web server in a private network, and so forth. The browser may be configured in a variety of ways. For example, the browser may be configured as a web browser suitable for use by a full resource device with substantial memory and processor resources (e.g., a personal computer, a laptop computer, a game console, etc.). In other implementations, the browser may be configured as a mobile browser suitable for use by a low-resource device with limited memory and/or processing resources (e.g., a PDA, a smart phone, a cell phone, etc.). Such mobile browsers typically conserve memory and processor resources, but may offer fewer browser functions than web browsers.

As illustrated in FIG. 1, the service-based software applications 108 furnished by the service provider 102 may include one or more features 112 that provide functionality to the clients 104. Thus, the service provider 102 may add or remove functionality by controlling access to the features 112 by the clients 104. For instance, a feature 112 may be made available to clients 104 within a first proportion of clients 114 (e.g., client 104(1) and client 104(2) in proportion 114). However, the feature 112 remains unavailable to clients 104 not in this proportion of clients (e.g., client 104(3) through client 104(n) in proportion 116). The feature 112 may be accessed by clients 104 in the proportion of clients 104 granted access via the client's user interface 110. For example, the service provider 102 may cause a link 118 to the feature to be provided by the user interface 110 of the clients 104 that are given to access the feature 112.

Figure 2:
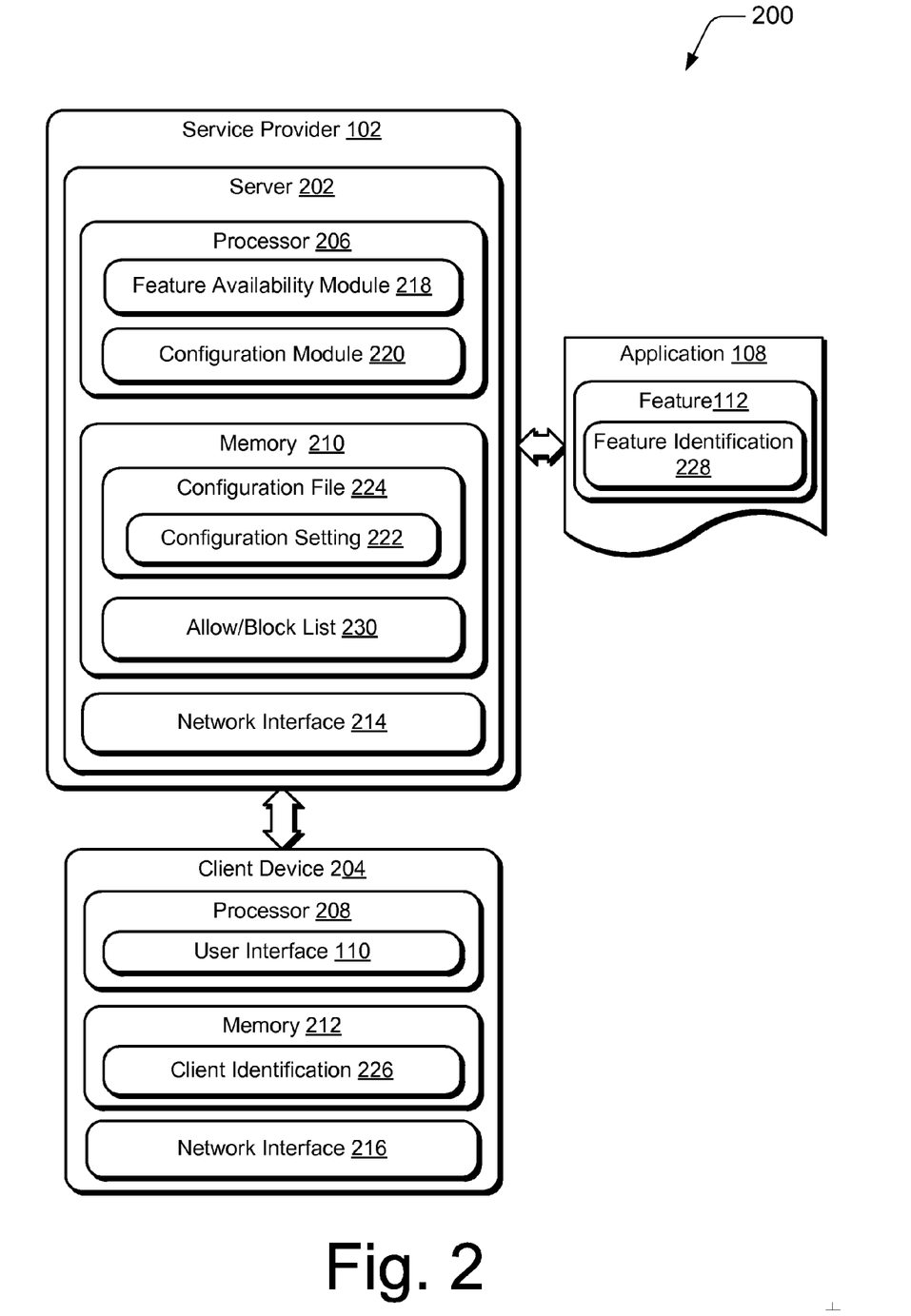
FIG. 2 is an illustration of a system in an example implementation showing a service provider and a client of FIG. 1 in greater detail.

FIG. 2 illustrates a system 200 in an example implementation showing the service provider 102 and a representative one of the clients 104 of FIG. 1 in greater detail. In FIG. 2, the service provider 102 is illustrated as being implemented by a server 202 while the client 104 of FIG. 1 is illustrated as being implemented by a client device 204. The server 202 and the client device 204 are illustrated as including a respective processor 206 or 208; a respective memory 210 or 212; and a respective network interface 214 or 218. In the following discussion, elements of the server 202 are described with reference to FIG. 2. Respective elements and/or reference numbers related of the client device 204 are shown in parentheses. Where appropriate, elements of the client device 202 are described separately.

The processor 206 (208) provides processing functionality for the server 202 (client device 204) and may include any number of processors, micro-controllers, or other processing systems and resident or external memory for storing data and other information accessed or generated by the server 202 (client device 204). The processor 206 (208) may execute one or more software programs which implement techniques described herein. The processor 206 (208) is not limited by the materials from which it is formed or the processing mechanisms employed therein, and as such, may be implemented via semiconductor(s) and/or transistors (e.g., electronic integrated circuits (ICs)), and so forth.

The memory 210 (212) is an example of computer-readable media that provides storage functionality to store various data associated with the operation of the server 202 (client device 204), such as the software program and code segments mentioned above, or other data to instruct the processor 206 (208) and other elements of the server 202 (client device 204) to perform the steps described herein. Although a single memory 210 (212) is shown, a wide variety of types and combinations of memory may be employed. The memory 210 (212) may be integral with the processor 206 (208), stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the client device 204, the memory 212 may include removable ICC (Integrated Circuit Card) memory such as provided by SIM (Subscriber Identity Module) cards, USIM (Universal Subscriber Identity Module) cards, UICC (Universal Integrated Circuit Cards), and so on. In implementations, the memory 210 of the service provider 102 may include memory to store one or more service-based software applications 108 to be provided to the client device 204.

The network interface 214 (216) provides functionality to enable the server 202 (client device 204) to communicate with one or more networks, such as network 106 of FIG. 1. In various implementations, the network interface 214 (216) may include a variety of components such as modems, routers, wireless access points, cellular telephone transceivers, and so forth, and any associated software employed by these components (e.g., drivers, configuration software, etc.). In FIG. 2, the network interface 214 (216) is illustrated as being an internal component of the server 202 (client device 204). However, in some implementations, one or more components of the network interface 214 (216) may be external components coupled to the server 202 (client device 204) via a wired or wireless connection.

As illustrated in FIG. 2, the server 202 may include a feature availability module 218 and a configuration module 220. The feature availability module 218 represents functionality to incrementally change the availability of a feature 112 of a service-based software application 108 based on a configuration setting 222 indicating a proportion of clients that is eligible to access the feature 112. The feature 112 may then be made available to the client device 204 if the client device 204 is within the proportion of clients that is eligible access to the feature 112 (e.g., a link to the feature 112 may be provided by the client's user interface 110). Conversely, the feature 112 may be made unavailable to the client device 204 if the client device 204 is not in this proportion of clients.

The configuration module 220 represents functionality to allow the service provider 102 to define the configuration setting 222. For instance, in one implementation, the configuration module 220 may generate a configuration file 224 containing the configuration setting 222 which is stored in memory 210. The configuration file 224 may be accessed by the feature availability module 218 to obtain the configuration setting 222. In embodiments, the configuration file 224 may comprise an Extensible Markup Language (XML) file which contains a configuration setting 222 expressed as a percentage of client devices 204 (e.g., 10%, 50%, 100%, etc.) that is eligible to access the feature 112.

The configuration setting 222 may be adjusted to increase or decrease the proportion of the client devices 204 to which the feature 112 is made available. For example, when a new feature 112 is deployed, it may desirable to initially limit the number of client devices 204 that have access to the feature 112. In such instances, the configuration setting 222 may be set to an initial value so that the feature 112 may be deployed to an initial proportion of the client devices 204 (e.g., the configuration setting may set to a value of "10%" to deploy the feature 112 to ten percent (10%) of the client devices 204 of the service provider 102). In this manner, the feature 112 may be evaluated by the service provider 102 without exposing the feature 112 to the full population of client devices 204. Thereafter, the configuration setting 222 may be increased over time to increase the proportion of the client devices 204 having access to the feature 112.

Similarly, in the event of a failure, an existing feature 112 may be made unavailable to client devices 204 until the failure is resolved. In such instances, the configuration setting 222 may be decreased from a first value (e.g., a configuration setting 222 having value set between 1% and 100%) to a null value (e.g., a configuration setting 222 having a value is set to 0%) to prevent the feature 112 from being made available to the client devices 204 of the service provider 102. When the failure is resolved, the configuration setting 222 may thereafter be increased from the null value (e.g., a configuration setting of 0%) to an initial value (e.g., the configuration setting is set to some small percentage of the clients such as 5%, 10%, etc.) to deploy the feature 112 to an initial proportion of the client devices 204. As with the initial deployment of a new feature 112, allowing deployment of the feature 112 to an initial proportion of the client devices 204, which may be small, allows the service provider 102 to test the feature 112 to verify its functionality. If it is determined that the feature 112 is functioning acceptably, the configuration setting 222 may be increased over time to increase the proportion of the client devices 204 that have access to the feature 112.

In embodiments, the service provider 102 may cause the configuration module 220 to change the configuration setting 222. For instance, in one embodiment, the configuration module 220 may adjust the configuration setting 222 by replacing the configuration file 224 with a configuration file 224 containing a new configuration setting 222. For example, when a feature 112 is deployed (e.g., initially or after a failure), the service provider 102 may cause the configuration module 220 to generate a configuration file 224 containing a configuration setting 222 that is set to an initial value so that the feature 112 may be deployed to an initial proportion of the client devices 204. For instance, a configuration file 224 may be stored containing a configuration setting 222 set to a value of "10" to deploy the feature 112 to ten percent (10%) of the client devices 204 of the service provider 102. Thereafter, when the service provider 102 desires to increase the proportion of clients having access to the feature 112, the service provider 102 may cause the configuration module 220 to replace the configuration file 224 with a new configuration file 224. The new configuration file 224 may contain a configuration setting 222 set to a higher value so that the feature is deployed to a larger proportion of the client devices 204. For example, a configuration file 224 may be stored containing a configuration setting 222 set to a value of "50" to cause the feature availability module 218 to deploy the feature 112 to fifty percent (50%) of the client devices 204 of the service provider 102.

The determination of whether a given client device 204 is within the proportion of clients that have access to a particular feature 112 is based on a client rank calculated for that client device 204. In the implementation illustrated in FIG. 2, the feature availability module 218 may calculate a client rank the client device 204. The client rank may be compared to the configuration setting to determine if the client device 204 is eligible to access the feature 112. In implementations, the client rank may be generated based on a client identification 226 that uniquely identifies the client device 204 and a feature identification 228 that uniquely identifies the feature 112. An example process for calculating client ranks in this manner is described herein in the discussion of FIG. 3.

In some instances, one or both of the client identification or feature identification may be unavailable. For instance, it may be desirable to allow a client device 204 to access a feature 112 before the client device 204 has identified itself to the service provider 102. In such instances, the feature availability module 218 may generate a client rank for the client device 204 that is comprised of a random number. For example, a webpage hosted by the service provider 102 may request that the client device 204 authenticate itself (e.g., via a "login" procedure, and so forth) to furnish the service provider 102 with the client identification 226 for the client device 204. Thus, prior to receiving authentication, the service provider 102 does not have access to the client identification 226 for the client device 204. Nevertheless, prior to receiving the authentication information, the service provider 102 may wish to provide a proportion of the client devices 204 navigating to the webpage with access to a feature 112 of a software application 108 furnished by the webpage. Accordingly, the feature availability module 218 may generate a random number that is used for the client rank of the client device 204. The random number may then be compared to the configuration setting 222 for the feature 112 to determine if the client device 204 is to be given access to the feature 112.

In implementations, the service provider 102 may further compare the client identification 226 of the client device 204 with a list of clients (e.g., add/block list 230) that indicates for selected clients, whether the client device 204 is eligible to receive the feature 112 or ineligible to receive the feature 112. In this manner, the client device 204 is either allowed access to a feature or denied access to a feature regardless of whether the client device 204 would be in the proportion of clients eligible to receive the feature 112 based on the client rank of the client device 204. For example, a service provider 102 may utilize a virtual test client to verify that a new feature 112 of a software application 108 is functioning acceptably. Consequently, it is desirable that the test client have access to the feature 112. Accordingly, the client identification 226 of the test client may be stored in the add/block list 230 so that the feature availability module 218 may provide access to the feature 112 to the test client regardless of the client rank of the test client.

Generally, any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processors 206 of the server 202 of FIG. 2. The program code can be stored in one or more computer readable media, an example of which is the memory 208 of the server 202 of FIG. 2. The features of the techniques to stream information describing a webpage described below are platform-independent, meaning that the techniques may be implemented on a variety of commercial computing platforms having a variety of processors.

Example Procedures

The following discussion describes techniques to incrementally change the availability of features of network based software services that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
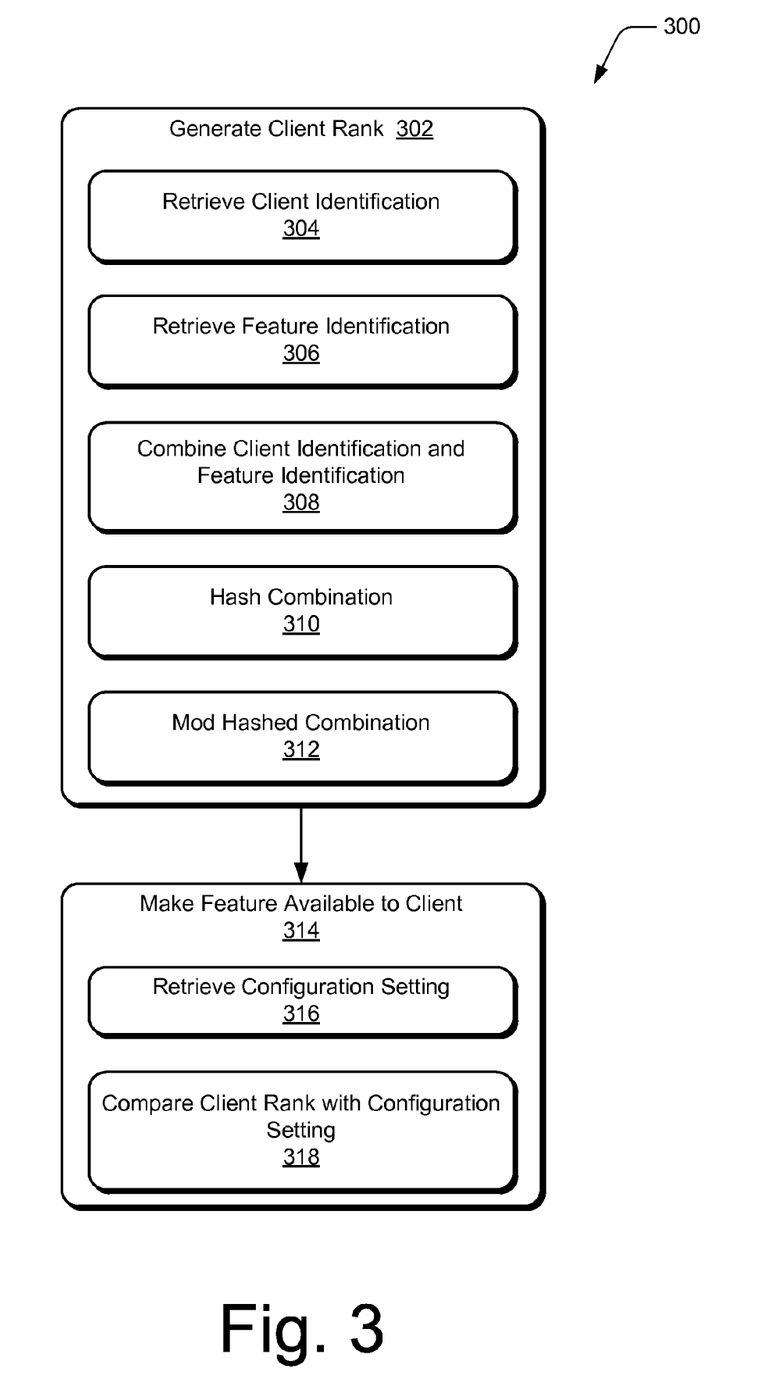
FIG. 3 is a flow diagram depicting a procedure in an example implementation in which a feature of a software service is made available to clients over a network based on a configuration setting indicating a proportion of the clients that is eligible to receive the feature.

FIG. 3 is a flow diagram 300 depicting a procedure in an example implementation in which a feature of a software service is made available to a client over a network if the client is determined to be in a proportion of clients that is eligible to receive the feature. A client rank is first generated for the client (block 302). In implementations, a client identification that identifies the client and a feature identification that identifies the feature are retrieved (blocks 304 and 306). For instance, in example embodiments, the client identification may be received from the client when the client accesses a webpage providing the software services, while the feature identification may be retrieved from memory associated with the feature of the software application. The client identification may be an identifier capable of uniquely identifying the client so that the client is distinguished from other clients on the network. For example, the client identifier may be a globally unique identifier (GUID), a text string (e.g., the name of a client ("Greg Friedman"), a User ID for the client ("Friedman1234"), an email address (Friedman@Microsoft.com"), etc.), a numeric identifier assigned to or chosen by the client, and so forth. The feature identification may likewise be an identifier capable of uniquely identifying the feature so that the feature is distinguished from other features of the software services. For example, the feature identification may be a text string such as a name of the feature (e.g., "Friend Inviter v1.01"), a textual description of the feature (e.g., "invite friends"), a numeric identifier assigned to the feature, and so forth.

The client identification and feature identification are then combined (block 308). The client identification and feature identification may be combined in a number of ways. For example, the client identification and feature identification may be combined by a mathematical operation (e.g., by adding values corresponding to the client identification and feature identification), by a logical operation (e.g., by using an exclusive or (XOR) operation to combine the client identification and feature identification), by a concatenation operation (e.g., by joining two character strings end to end), and so forth.

The combined client identification and feature identification is then subjected to a hash function (block 310). In implementations, the hash function may convert the combined client identification and feature identification into a smaller datum typically referred to as a hash value. For example, in one embodiment, the hash function may return a hash value for the combined client identification and feature identification comprised of a 32-bit number.

Next, the hash value of the hashed combined client identification and feature identification may be subjected to a modulo operation (block 312). For instance, in example embodiments, the hash value may be subjected to an "n modulo 100" operation (hereinafter "n mod 100") where n is the value of the hash value. In such embodiments, the n mod 100 operation may return a client rank that is a value between 0 and 99. However, it is contemplated that the client rank may have larger or smaller values.

The feature may then made available to the client via the network if the client rank indicates that the client is eligible to access the feature (block 314). In implementations, a configuration setting is retrieved (block 316). For example, as described in the discussion of FIG. 2, the configuration setting may be retrieved from a configuration file 224 stored in memory 210 by the service provider 102. In example embodiments, the configuration setting may be a percentage of clients having a value between 0% and 100%. However, it is contemplated that the configuration setting in other ways and may have larger or smaller values.

The client rank is next compared to the configuration setting to determine if the client is eligible to receive access to the feature (block 318). In one embodiment, the client may be determined to be eligible to receive access to the feature if the client rank is less than or equal to the configuration setting. Thus, for example, if the configuration setting is set to 10%, a client having a client rank calculated to be 5 would receive access to the feature; while a client having a client rank calculated to be 17 would not.

It is contemplated that other comparisons between the client rank and configuration setting may be made. For instance, in example embodiments, the client may be made eligible to receive access to a feature if the client rank of the client is determined to be less than but not equal to the configuration setting, equal to the configuration setting, greater than or equal to the configuration setting, greater than but not equal to the configuration setting, and so forth. Further, it is contemplated that two or more configuration settings may be retrieved. Clients having a client rank falling within a span of values created by the configuration settings may be determined to be eligible to receive access to the feature. For example, in one embodiment, first and second configuration settings may be retrieved. A client having a client rank that is greater than or equal to the first configuration setting and less than or equal to the second configuration setting may receive access to the feature. However, another client having a client rank that is either less than the first configuration value or greater than the second configuration value may not receive access to the feature. Other combinations of configuration settings are possible.

Figure 4:
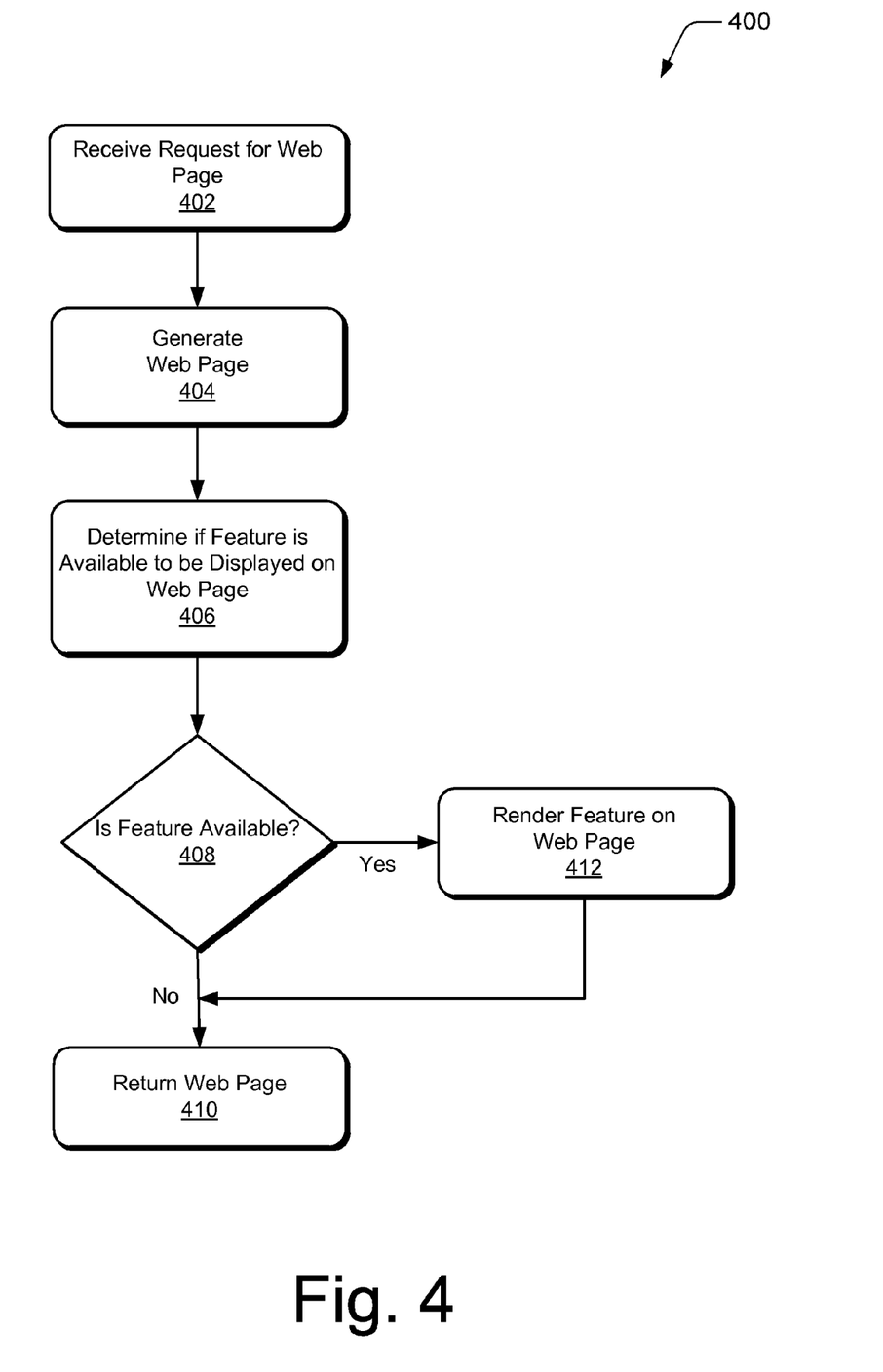
FIG. 4 is a flow diagram depicting a procedure in an example implementation in which a feature of a software service is made available to a client over a network via a webpage.

FIG. 4 is a flow diagram depicting a procedure 400 in an example implementation in which a feature of a software service is made available to a client over a network via a webpage. A client may submit a request to a service provider such as a web server for a webpage providing access to software services furnished by the service provider (block 402). For example, the client may navigate to the webpage using the client's browser, whereupon a request is sent by the browser to the service provider to generate and return the webpage for display in the user interface furnished by the browser.

When the request is received by the service provider, the service provider may begin generating the webpage (block 404). To generate the webpage, the service provider may determine if one or more features of the software services furnished via the webpage are to be made available to the client (block 406). For instance, in example implementations, a procedural call may be made as the webpage is being generated to determine if a feature of the software services is to be made available to the client requesting the webpage. An example procedural call is described in the discussion of the procedure illustrated in FIG. 5.

If a determination is made (block 408) that the feature is not to be made available to the client (e.g., a value of "false" is returned by the procedural call), the webpage is generated without the feature and returned to the client (block 410). The webpage may then be displayed to the client via the user interface furnished by the client's browser. If, on the other hand, a determination is made (block 408) that the feature is to be made available to the client (e.g., a value of "true" is returned by the procedural call), the feature is rendered in the webpage (e.g., indicia linking to the feature are rendered on the webpage to furnish access to the feature). The webpage, containing the feature, is then returned to the client and may be displayed via the user interface furnished by the client's browser (block 410).

Figure 5:
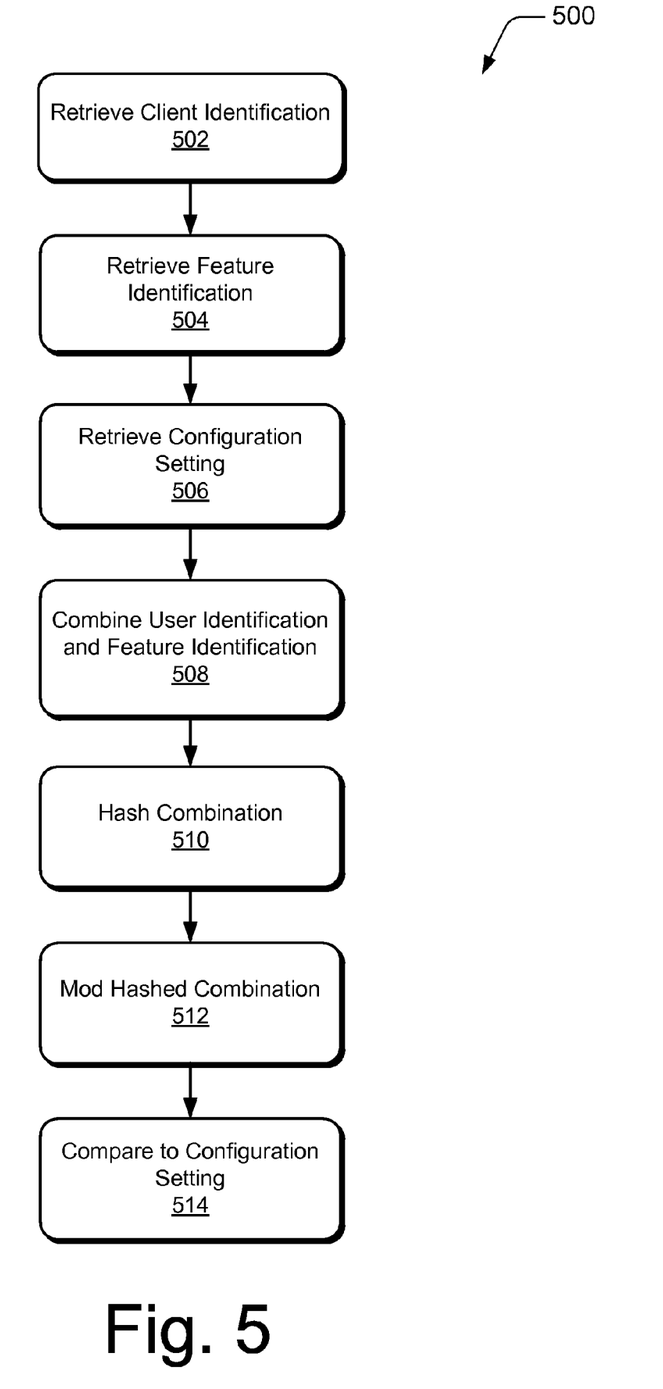
FIG. 5 is a flow diagram depicting a procedure in an example implementation in which a determination is made as to whether a feature of a software service is to be made available to a client over a network via a webpage.

FIG. 5 is a flow diagram depicting a procedure 500 in an example implementation in which a determination is made whether a feature of a software service is to be made available to a client over a network via a webpage. In embodiments, the procedure 500 may be implemented by a procedural call made to determine if the feature is to be made available to the client as described the discussion of FIG. 4.

As shown in FIG. 5, a client identification that identifies the client and a feature identification that identifies the feature are retrieved (blocks 502 and 504). The client identification and feature identification may be formatted in a variety of ways as described in the discussion of FIG. 3. A configuration setting is also retrieved (block 506). For example, as described in the discussion of FIG. 2, the configuration setting may be retrieved from a configuration file that is generated by the configuration module and stored in memory by the service provider. In example embodiments, the configuration setting may be expressed as a percentage of clients having a value between 0 and 100 (e.g., 0%, 10%, 50%, 100%, etc.).

The client identification and feature identification are then combined (block 508). As described in the discussion of FIG. 3, the combination of the client identification and feature identification may be accomplished in a variety of ways (e.g., via a mathematical operation, via a logical operation, by concatenation, etc.). The combined client identification and feature identification may then be subjected to a hash function (block 510) to generate a hash value. Next, the hash value may be subjected to a modulo operation, such as an "n modulo 100" operation, to return a client rank suitable for comparison with the configuration setting (block 512). The client rank is then compared to the configuration setting (block 514). If the client rank is determined to be less than or equal to the configuration setting, a value of "true" may then be returned by the procedural call indicating that the client is determined to be eligible to receive access to the feature. Otherwise, a value of "false" may be returned.

CONCLUSION

Although various embodiments have been described in language specific to structural features and/or methodological acts, it is to be understood that embodiments defined in the appended claims are not necessarily limited to the specific features or acts described. Rather, the specific features and acts are disclosed as example forms of implementing one or more embodiments.

What is claimed is:

1. One or more computer-readable storage media hardware comprising processor-executable instructions which, responsive to execution by at least one processor, are configured to:
   incrementally change availability of a feature of a software service to one or more clients over a network based on a configuration setting indicating a proportion of the one or more clients that is eligible to receive the feature, the eligibility of a respective client of the one or more clients based, at least in part, on a respective client rank, the respective client rank based, at least in part, on a respective client identification, that identifies the respective client, and a feature identification, that identifies the feature, that are combined to generate a respective combined client identification and feature identification; and
   generate the respective client rank based, at least in part, on the respective combined client identification and feature identification;
   determine whether access to the respective client identification exists;
   responsive to determining access to the respective client identification exists, generate the respective client rank based, at least in part, on combining the respective client identification with the feature identification to generate a respective combined client identification with the feature identification value; and
   responsive to determining access to the respective client identification does not currently exist for at least one client, generate the respective client rank by assigning a random number as the respective client rank.

2. The one or more computer-readable storage media hardware as described in claim 1, wherein the configuration setting is adjustable to increase or decrease the proportion of clients that is eligible to receive the feature.

3. The one or more computer-readable storage media hardware as described in claim 2, wherein the configuration setting is set to an initial value to deploy the feature to an initial proportion of the clients and is thereafter increased over time to deploy the feature to an increasing proportion of the one or more clients.

4. The one or more computer-readable storage media hardware as described in claim 2, wherein the configuration setting is decreased from a first value to a null value in response to detecting a failure associated with the feature and is thereafter increased from the null value to an increased value to deploy the feature to an additional proportion of the one or more clients.

5. The one or more computer-readable storage media hardware as described in claim 1, further comprising processor-executable instructions that are configured to:
    compare the respective client rank with the configuration setting to determine if the respective client is eligible to receive the feature.

6. The one or more computer-readable storage media hardware as described in claim 1, wherein the processor-executable instructions to generate the respective client rank are further configured to:
    subject the respective combined client identification and feature identification to a hash function to generate a respective hash value; and
    subject the hash value to a modulo operation to generate the respective client rank.

7. The one or more computer-readable storage media hardware as described in claim 1, further comprising processor-executable instructions that are configured to compare the respective client identification of each of the one or more clients with a list of clients, the list of clients indicating for selected clients of the one or more clients whether the selected clients are one of eligible to receive the feature or ineligible to receive the feature regardless of the respective client ranks of the select clients.

8. The one or more computer-readable storage media hardware of claim 1, wherein the processor-executable instructions are further configured to receive the respective client identification from an authentication procedure associated with the respective client.

9. The one or more computer-readable storage media hardware of claim 1, wherein the processor-executable instructions are further configured to obtain the configuration setting from a configuration file.

10. A computer-implemented method comprising:
    incrementally changing availability of a feature of a software service to one or more clients over a network based, at least in part, on:
        a configuration setting indicating a proportion of the clients of the one or more clients that is eligible to receive the feature, the configuration setting configurable to: increase or decrease the proportion of clients that is eligible to receive the feature; and prevent the feature from being made available to the clients by utilizing a null value; and
        a respective client rank of each respective client of the one or more clients, the respective client rank based, at least in part, on a respective client identification that identifies the respective client and a feature identification that identifies the feature of the software service,
    the changing the availability comprising:
        determining whether access to the respective client identification exists;
        responsive to determining access to the respective client identification exists, generating the respective client rank based, at least in part, on combining the respective client identification with the feature identification; and
        responsive to determining access to the respective client identification does not currently exist, generating the respective client rank by assigning a random number as the respective client rank.

11. The computer-implemented method as described in claim 10, further comprising:
    setting the configuration setting to an initial value effective to deploy the feature to an initial proportion of the clients; and
    thereafter increasing the configuration setting over time to deploy the feature to an increasing proportion of the clients.

12. The computer-implemented method as described in claim 10, further comprising:
    decreasing the configuration setting from a first value to the null value effective to prevent the feature from being made available to the clients; and
    thereafter increasing the configuration setting from the null value to an initial value to deploy the feature to an initial proportion of the clients.

13. The computer-implemented method as described in claim 10, further comprising:
    comparing the respective client rank with the configuration setting to determine if the respective client is eligible to receive the feature.

14. A system comprising:
    at least one processor; and
    one or more computer-readable storage media hardware comprising processor-executable instructions which, responsive to execution by the at least one processor, are configured to enable the system to:
        incrementally change availability of a feature of a software service, provided by a service provider, to one or more clients over a network based on a configuration setting indicating a proportion of the one or more clients that is eligible to receive the feature, the eligibility of a respective client of the one or more clients based, at least in part, on a respective client rank, the respective client rank based, at least in part, on a respective client identification, that identifies the respective client, and a feature identification, that identifies the feature of the software service, the configuration setting being adjustable to increase or decrease the proportion of clients that is eligible to receive the feature,
    the system further configured to:
        determine whether access to the respective client identification exists;
        responsive to determining access to the respective client identification exists, generate the respective client rank based, at least in part, on combining the respective client identification with the feature identification to generate a respective combined client identification with the feature identification value; and
        responsive to determining access to the respective client identification does not currently exist, generate the respective client rank by assigning a random number as the respective client rank.

15. The system as described in claim 14 further comprising processor-executable instructions that are configured to:

subject the respective combined client identification and feature identification to a hash function to generate a respective hash value; and subject the respective hash value to a modulo operation to generate the respective client rank.

16. The system as described in claim 15, wherein:

the modulo operation comprises an n modulo 100 operation, where n is the hash value, the configuration setting is a percentage between 0% and 100%, and the client rank is a value between 0 and 99.

17. The system as described in claim 14, wherein the processor-executable instructions are further configured to:

compare the respective client identification of each respective client of the one or more clients with a list of clients, the list of clients indicating for selected clients of the one or more clients whether the selected clients are one of eligible to receive the feature or ineligible to receive the feature regardless of the client ranks of the select clients.

18. The system as described in claim 14 further configured to obtain the configuration setting from a configuration file, the configuration file comprising an Extensible Markup Language (XML) file.

19. The system as described in claim 14, wherein the system is further configured to:

allow a respective client of the one or more clients access to the feature based on the respective client identification being present in an add/block list, regardless of the respective client rank of the respective client.

\* \* \* \* \*